United States Patent [19]

Ono et al.

[11] Patent Number: 4,734,633
[45] Date of Patent: Mar. 29, 1988

[54] SPEED CONTROL APPARATUS FOR A SYNCHRONOUS MOTOR

[75] Inventors: Tadahiro Ono; Naoshi Miura, both of Shizuoka, Japan

[73] Assignees: Toei Denki Kabushiki Kaisha; Toshiba Kikai Kabushiki Kaisha, both of Tokyo, Japan

[21] Appl. No.: 741,585

[22] Filed: Jun. 5, 1985

[30] Foreign Application Priority Data

Jun. 5, 1984 [JP] Japan ............................ 59-115340

[51] Int. Cl.$^4$ ............................................. H02P 5/40
[52] U.S. Cl. ..................................... 318/723; 318/722
[58] Field of Search ................ 318/721, 722, 723, 661

[56] References Cited

U.S. PATENT DOCUMENTS

| | | | |
|---|---|---|---|
| 4,125,796 | 11/1978 | Nagase et al. | 318/721 |
| 4,246,528 | 1/1981 | Nakajima | 318/723 |
| 4,262,241 | 4/1981 | Azusawa | 318/722 |
| 4,276,504 | 6/1981 | Nagase et al. | 318/722 |
| 4,357,569 | 11/1982 | Iwakane et al. | 318/661 |
| 4,358,722 | 11/1982 | Iwakane et al. | 318/661 |
| 4,384,242 | 5/1983 | Ono | 318/661 |
| 4,489,266 | 12/1984 | Frazolini | 318/800 |
| 4,547,719 | 10/1985 | Sakamoto et al. | 318/723 |
| 4,629,958 | 12/1986 | Kurakake et al. | 318/722 |

FOREIGN PATENT DOCUMENTS

| | | |
|---|---|---|
| 0085541 | 8/1983 | European Pat. Off. . |
| 0089673 | 9/1983 | European Pat. Off. . |
| 2734430 | 2/1978 | Fed. Rep. of Germany . |
| 2451657 | 10/1980 | France . |
| 1046983 | 10/1966 | United Kingdom . |

*Primary Examiner*—David Smith, Jr.
*Attorney, Agent, or Firm*—Cushman, Darby & Cushman

[57] ABSTRACT

A speed control apparatus for a synchronous motor is provided with a resolver fixedly connected to a rotor of the motor, which produces a phase modulated signal corresponding to an angular position of revolving magnetic field in the motor, a circuit for converting the phase modulated signal into a rotational speed signal of the motor, a phase compensation circuit for advancing in phase a reference signal in accordance with the rotational speed signal, a multiplier for multiplying the phase modulated signal and a rotational speed instruction signal, a synchronous rectifier for synchronously rectifying the output of the multiplier by an output of the phase compensation circuit, and a current control loop circuit for receiving an output of the synchronous rectifier and for producing a signal having a phase angle delayed as much as the phase angle is advanced in the phase compensation circuit.

10 Claims, 16 Drawing Figures

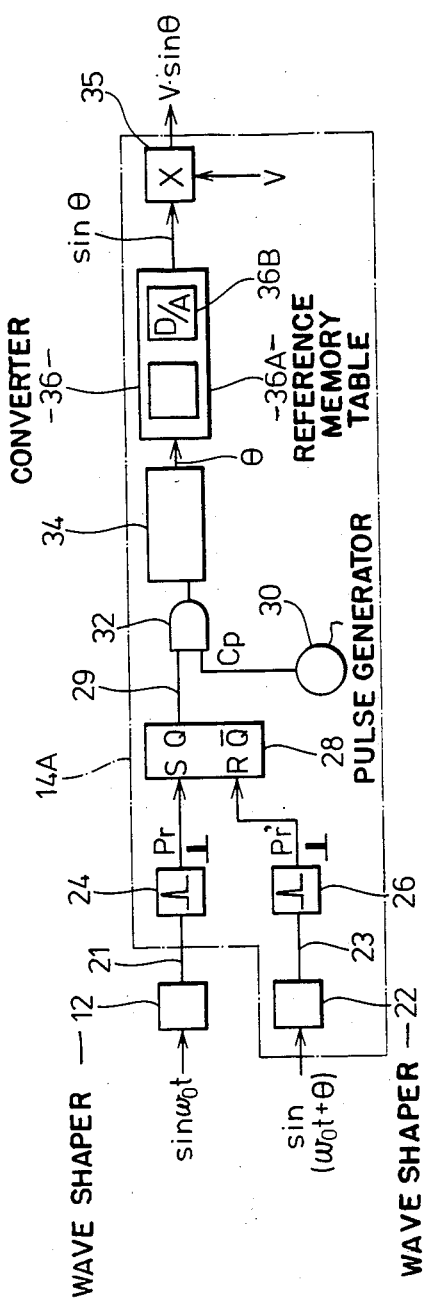

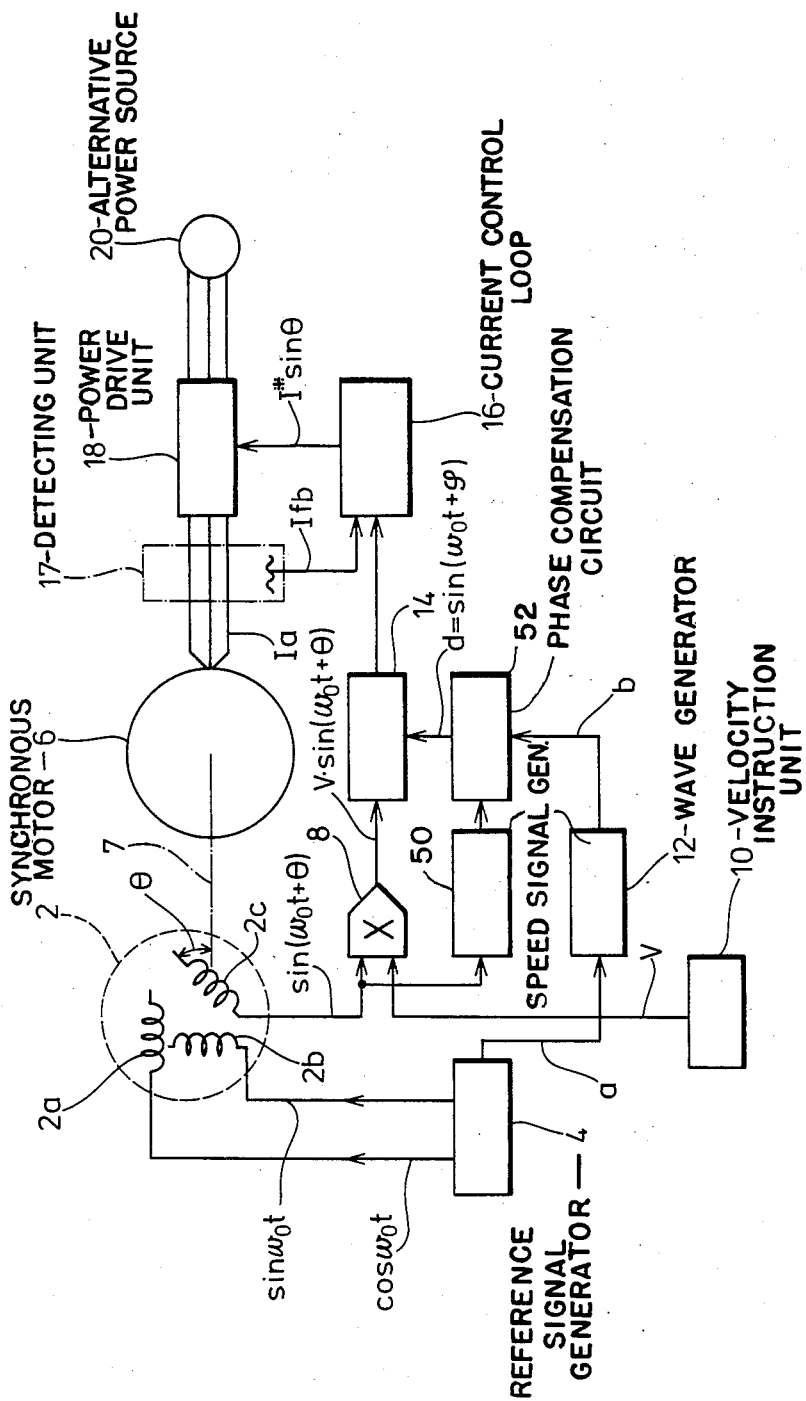

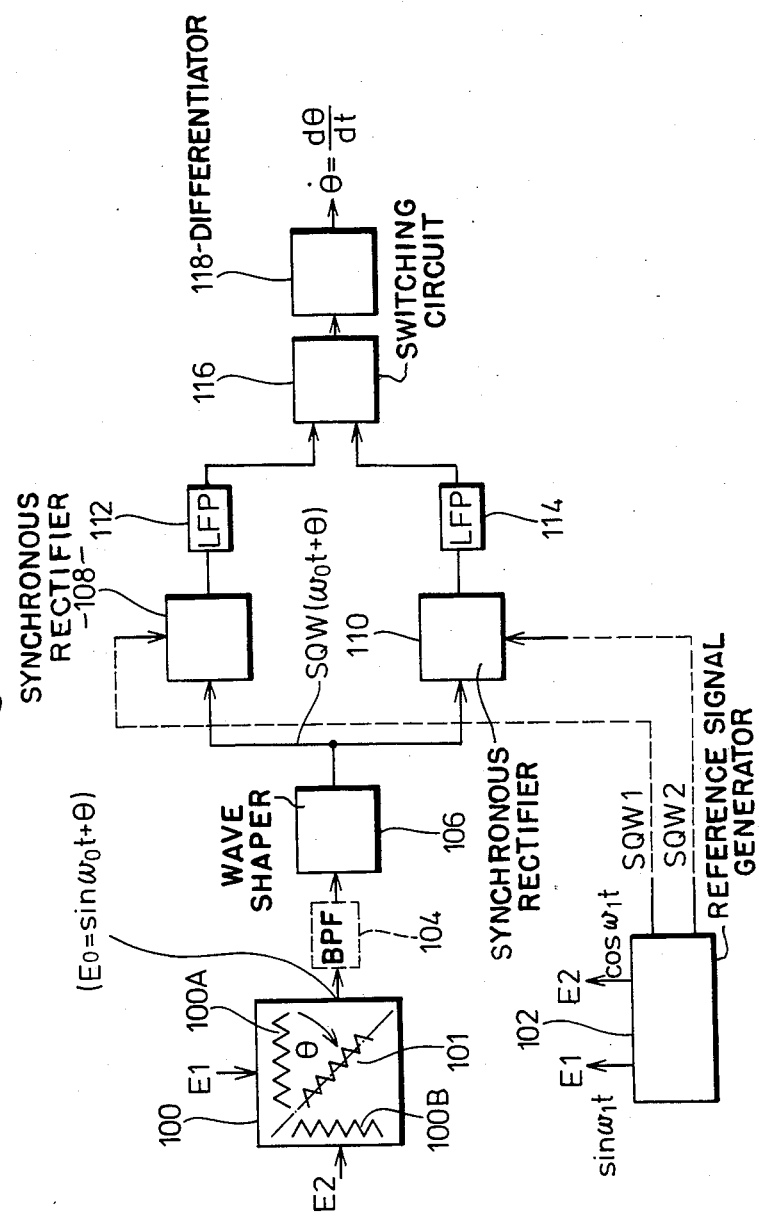

SPEED CONTROL APPARATUS FOR A SYNCHRONOUS MOTOR

BACKGROUND OF THE INVENTION

The present invention relates to a speed control apparatus for an electric motor of the type utilizing alternative current in the armature, and more specifically to a variable speed control apparatus for a synchronous motor of the type having a revolving magnetic field.

The synchronous motor of the type having a rotary magnetic field is provided with an armature defining a stator and field poles defining a rotor. Multi-phase alternative current flowing in the stator windings of the motor generate revolving magnetic fields which cause the rotor to synchronously rotate by magnetic pulling forces acting on it. It is helpful for understanding of the invention to explain here the relationships of torques to be generated between a direct current (D.C) motor and a synchronous motor, prior to the description of the conventional speed control apparatus for the synchronous motor.

FIG. 1A illustrates a sectional view on the rotation axis of a D.C. motor, wherein FM represents field poles, AM is an armature, AW is armature windings, and DCV is a direct current voltage source. FIG. 1B illustrates Fleming's left hand law concerning armature current (Ia), field or magnetic flux ($\phi$) and torque (T) to be generated on the D.C. motor shown in FIG. 1A. As shown in FIGS. 1A and 1B, a rectifier RC switches armature current Ia so that it always flows in a direction perpendicular to that of magnetic flux $\phi$. In the case, this torque T to be generated is as follows:

$$T = K \cdot \phi \cdot Ia \tag{1}$$

where K is a constant. The equation (1) shows that torque T is proportional to armature current Ia under the condition that the magnitude of magnetic flux $\phi$ is kept constant.

FIG. 2 illustrates a sectional view on the rotation axis of a synchronous motor provided with rotary field magnetic poles PM, wherein "SW" designates stator windings and "Is" designates the current vector flowing in the stator windings "SW". In order to apply the equation (1) to a synchronous motor provided with rotary field magnetic poles as shown in FIG. 2, it is necessary to correspond the magnetic flux $\phi$ to the magnetic flux vector $\phi s$ of field poles PM, and further to correspond armature current Ia to the current vector Is of the stator windings SW. Accordingly, the torque T to be generated in the synchronous motor is given in the following equation (2):

$$T = K \cdot \phi s \cdot Is \cdot \cos \gamma \tag{2}$$

FIG. 3 illustrates an electric circuit equivalent to the synchronous motor shown in FIG. 2. In the figure, Ra designates an electric resistance of the stator (armature) windings, and Xs designates a reactance equivalent to the reaction and the leakage magnetic flux on the stator windings. Further, $\dot{V}$ is a voltage source, and $\gamma$ is the phase difference between the armature current Is and the electromotive force $\dot{E}o$ induced on the stator windings by the armature current. Therefore, when the phase difference $\gamma$ is zero, that is, the electromotive force $\dot{E}o$ is in phase with the armature current Is, the equation (2) becomes the following:

$$T = K \cdot \phi s \cdot Is \tag{3}$$

The equation (3) shows the possibility that the synchronous motor can be driven in the same fashion as in torque generation with a D.C. motor. In other words, the equation (3) indicates that it is necessary for efficiently driving the synchronous motor to control the armature current Is flowing in the stator windings so as to make the revolving field magnetic flux $\phi s$ always at a right angle with the armature current Is.

Furthermore, the armature current Is is defined as a function of first order lag to the rotary angular velocity $\omega$ of the synchronous motor, which includes a time constant Ta formed with electric resistance Ra and inductance La of the stator windings. Accordingly, it results that the phase lag of the armature current Is is produced as the rotation speed of the synchronous motor becomes high. This is a conventional way to adopt a current control loop in the drive unit of the synchronous motor for making the phase lag smaller.

FIG. 4 illustrates control block diagrams corresponding to the drive unit of the motor. In the figure, Gv designates a gain of a current amplifier in the unit, and Gi designates a current feedback gain in the unit.

In FIG. 4, the transfer function G(s) of the unit is defined as follows:

$$G(s) = I/V = \frac{Gv\left(\frac{1}{Ra} \cdot \frac{1}{1+STa}\right)}{1 + Gi \cdot Gv\left(\frac{1}{Ra} + \frac{1}{1+STa}\right)} \tag{4}$$

where $S = j\omega$. Furthermore, open loop gain Go(s) is defined as follows:

$$Go(S) = Gi \cdot Gv / Ra(1+STa) \tag{5}$$

When $Go(S) \gg 1$, however, the transfer function G(S) becomes as follows:

$$G(S) = 1/Gi \tag{6}$$

The equation (6) indicates that the transfer function G(ds) is independent of the time constant Ta and rotary angular velocity $\omega$ under the condition of $Go(S) \gg 1$. This is the reason why the current control loop is provided on the drive unit of the synchronous motor.

FIG. 5 illustrates a conventional type of control circuit for drive control of a synchronous motor. In the figure, reference numeral 2 designates a two phase resolver for producing a phase modulated signal with respect to a rotary angle $\theta$ of a rotor 7 mounted on a synchronous motor 6, and reference numerals 2a, 2b are primary windings of resolver 2, each being COS windings and SIN windings to which sinusoidal wave signals cos ($\omega$ot) and sin ($\omega$ot) are applied from a reference signal generator 4, respectively. Reference numeral 2c designates a secondary winding mounted on a rotor of resolver 2, the rotor being fixed on rotor 7 of motor 6. A signal Sin ($\omega$ot + $\theta$) is produced on secondary winding 2c as electromotive force generated between primary winding 2a 2b and secondary windings 2c.

Reference numeral 8 designates a multiplier for multiplying the output signal sin ($\omega$ot + $\theta$) and an output signal V of a velocity instruction unit 10. Reference numeral 12 designates a wave shaper for shaping an output signal sin (ωot) into rectangular pulse trains.

Reference numeral 14 designates a synchronous rectifier circuit (or phase descriminating circuit) for synchronously rectifying an output signal V·sin (ωot+θ) of multiplier 8 with the rectangular wave signal from wave shaper 12. Reference numeral 16 designates a current control loop for producing a control signal I* sin θ applied to a known power drive unit 18 formed with semiconductor devices. The current control loop 16 receives the signal V·sin θ and a current feed back signal I$_{fb}$ which is produced at a detecting unit 17 which detects a current actually flowing in the armature of motor 6. Reference numeral 20 designates an alternative power source.

FIGS. 6A, 6B are detailed circuit block diagrams of synchronous rectifier 14 shown in FIG. 5. FIGS. 6A and 6B illustrate digital and analogue types of synchronous rectifiers, respectively.

As shown in FIG. 6A, a digital type of synchronous rectifier 14A is provided with a wave shaper 22 for forming a rectangular wave signal 23 from the signal sin (ω+θ), a differentiator 24 for producing a pulse signal Pr by differentiating in time an output signal 21 of wave shaper 12 at a time corresponding to the rising up of each output rectangular signal 21 as shown in FIG. 6C, another differentiator 26 for producing a pulse signal Pr' by differentiating in time output signal 23 of wave shaper 22 at a time corresponding to rising up of each signal 23 as shown in FIG. 6C, and a flip flop circuit 28 which is set by the pulse Pr and reset by the pulse Pr'. The synchronous rectifier 14A is further provided with an AND gate 32 which allows clock pulses Cp from a pulse generator 30 to pass when flip flop 28 is set, a counter 34 for counting the number of the clock pulses supplied from AND gate 32, and a converter 36 for producing a signal V·sin θ from the values of counter 34 and speed instruction signal V, the value of counter 34 corresponding to the phase difference θ between the reference signal sin ωot and a phase modulated signal sin (ωot+θ) by resolver 2. Converter 36 includes a reference memory table 36A for referring to the values θ and converting them to sin θ for processing in a digital to analogue converter 36B. A multiplier 35 for multiplying the speed instruction signal V and the signal sin θ is also provided.

FIG. 6B illustrates an analogue type of synchronous rectifier 14. In the figure, reference numeral 38 designates a wave shaper whose output signal is logically inverted in an inverter 45 and applied to a switch 44 in analogue switch unit 40. Another output signal of wave shaper 38 is applied to a switch 42 in analogue switch unit 40. Switch 42 allows the signal V·sin (ωot+θ) to pass to a low pass filter 48 which forms a signal V·sin θ. Switch 44 allows inverted signal 47 of V·sin (ωot+θ), which is formed by an analogue inverter unit 41 having an operational amplifier 46, an input resistance 46A and a feedback resistance 46B, to pass to low pass filter 48.

FIG. 7A illustrates a circuit diagram of current control loop 16 shown in FIG. 5. In the figure, reference numeral 16A designates an operational amplifier having gain Gi. Reference numerals 16B, 16C and 16D are electric resistances. Reference numeral 16E is a capacitor.

Hereinafter, the functions and operations of circuit block diagrams shown in FIG. 5 will be explained.

In the figure, when rotor 7 rotatably mounted on synchronous motor 6 rotates at its angular velocity ω and its rotary angle becomes at an angle θ as shown in the figure, secondary winding 2C of resolver 2 produces a phase modulated signal sin (ωot+θ). Multiplier 8 multiplies speed instruction signal V and the phase modulated signal sin (ωot+θ), thereby producing the signal V·sin (ωot+θ). Synchronous rectifier 14 synchronously rectifies the signal V·sin (ωot+θ) by a rectangular wave signal given from wave shaper 12 and produces the signal V·sin θ corresponding to the angular position of rotor 7. This signal V·sin θ and current feedback signal I$_{fb}$ are supplied to current control loop unit 16 which produces the control signal I* sin θ applied to the semiconductor type drive unit 18. In the unit 18, the signal I* sin θ is modified into multi-phase alternative current signals, each phase signal being supplied to power inverting devices corresponding to each armature winding mounted on the stator of motor 6. Thus, each armature current makes a revolving magnetic field in motor 6. As mentioned above, since each armature current is supplied in accordance with the rotor's rotation angle θ equal to the direction of magnetic field in the motor, the phase difference between the directions of the magnetic flux θ and each armature current can be held at a right angle π/2. However, as the rotation speed becomes high and the angular velocity ω becomes large, the equation (5) does not hold.

FIG. 7B shows a transfer function G(jω) which has frequency characteristics depending on the values of "ω". In the figure, the output signal I$_a$ sin (θ−φ) includes a phase lag φ because of large values of the rotary angular velocity ω. In this case, φ is defined as the phase angle of the transfer function G(jω), as follows:

$$\phi = \arg \cdot G(j\omega)$$

FIG. 7C is a general control block diagram for suggesting a basic technical concept for eliminating phase lag φ indicated in FIG. 7B. In the figure 7C, a block 40 suggests a possibility of phase lag elimination by the way that the signal V·sin θ is operated with φ formed by the motor's rotation speed v and a constant k, thereby advancing the phase θ by the angle φ.

Furthermore, as shown in FIG. 4 and FIG. 5, block element Gv corresponding to a power amplifier in drive unit 18 has, in general, some delay circuit elements, thereby the total phase lag depending on the rotary angular velocity ω becomes that much larger. Therefore, in the conventional speed control apparatus for the synchronous motor shown in FIG. 5, a desired controlability cannot be obtained when the motor rotates at high speed because phase differences between the revolving magnetic field and armature current (Ia) are generated.

SUMMARY OF THE INVENTION

Accordingly, it is a primary object of the present invention to provide a control apparatus for a synchronous motor in which a revolving magnetic field with magnetic flux φ and an armature current Ia are always controlled so as to be at right angles with each other, whereby a desired controllability can be obtained even at high rotational speeds of the motor.

Another object of the present invention is to provide a compensation device for compensating a phase lag of an armature current generated in the motor drive unit with a current control loop.

According to this invention, these objects can be accomplished by providing a speed control apparatus for the synchronous motor, which comprises a detecting device for producing a signal with respect to an angular position of a revolving magnetic field corresponding to that of a rotor on the motor, an operation device responsive to a signal from the detecting device for producing an armature current command signal for a required armature current, a current control loop circuit responsive to the armature current command signal for producing the armature current, a power inverting device responsive to a signal from the current control loop circuit for flowing the required armature current in the armature windings of the motor, and a phase compensation device responsive to a rotational speed of the motor for compensating the armature current command signal by advancing the phase angle of the signal. The invention will now be described in more detail with reference to the accompanying drawings.

BRIEF DESCRIPTION OF THE DRAWINGS

In the accompanying drawings:

FIG. 6A illustrates a digital type of synchronous rectifier circuit;

FIG. 8 is a circuit block diagram of a speed control apparatus according to the present invention;

FIG. 11 illustrates a circuit block diagram for producing a speed signal $\dot{\theta}=(d\theta/dt)$ from a phase modulated signal Eo generated on a secondary winding of a two phase resolver.

DESCRIPTION OF THE PREFERRED EMBODIMENT

Figure 1A:
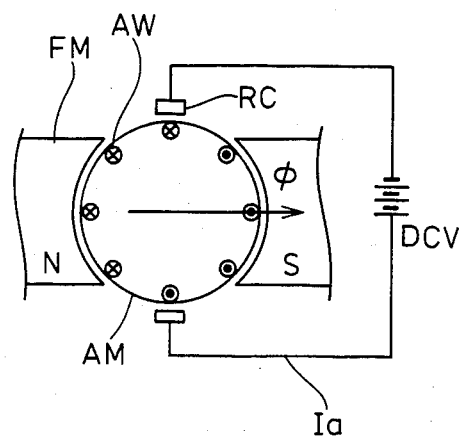
FIG. 1A is a sectional view on the axis of a direct current motor for explaining torque generation thereon.
Figure 1B:
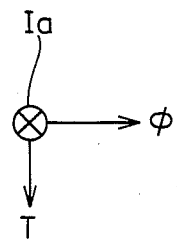
FIG. 1B illustrates relationships of directions among an armature current, a magnetic field and a torque.
Figure 2:
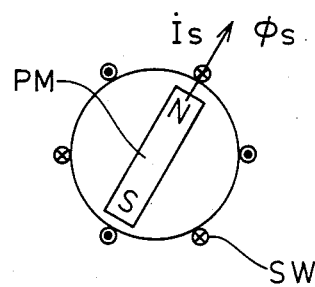
FIG. 2 is a sectional view on the axis of a synchronous motor of the type having a revolving magnetic field.
Figure 3:
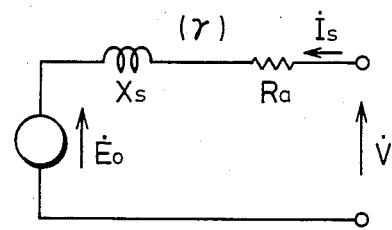
FIG. 3 is an equivalent circuit of the motor shown in FIG. 2.
Figure 4:
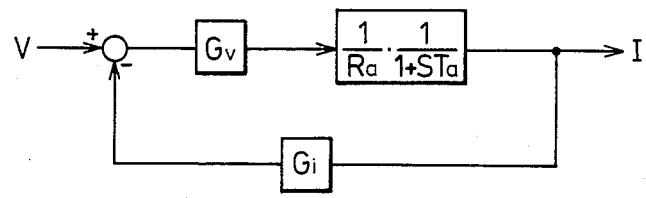
FIG. 4 is a general block diagram of transfer functions corresponding to a speed control system for a synchronous motor.
Figure 5:
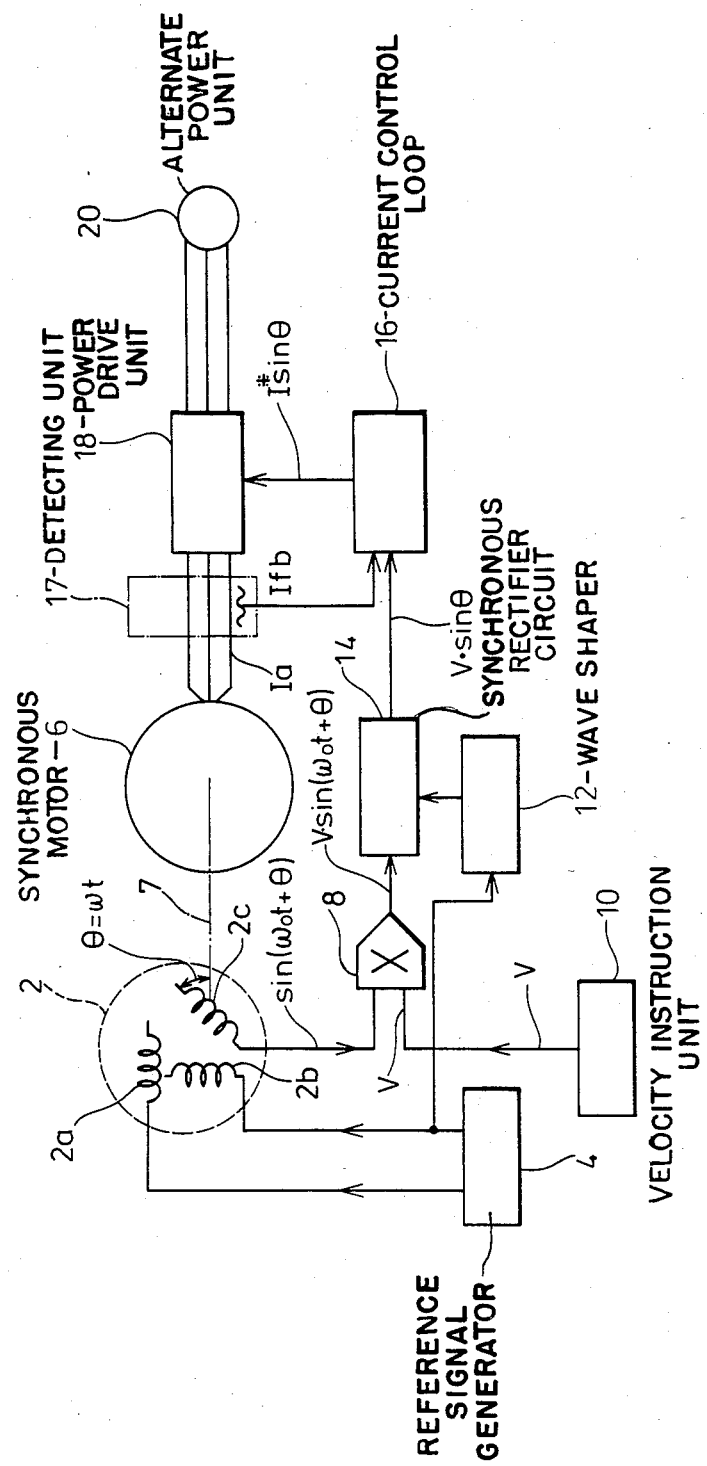
FIG. 5 illustrates a block diagram of a conventional control circuit for a synchronous motor.
Figure 6B:
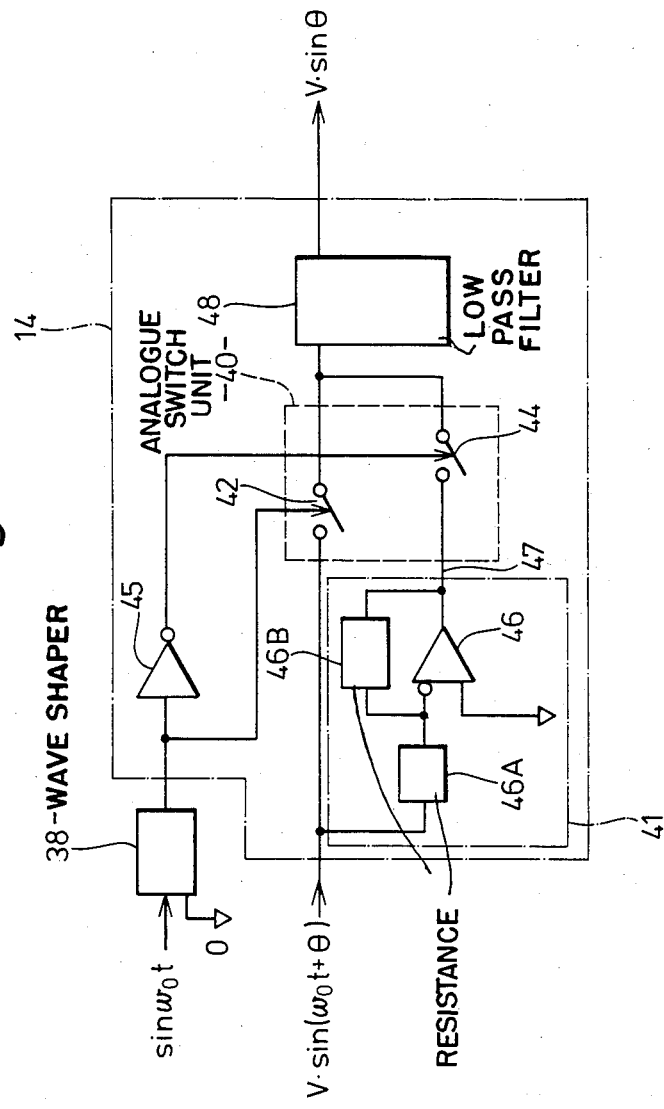
FIG. 6B illustrates an analogue type of synchronous rectifier circuit.
Figure 6C:
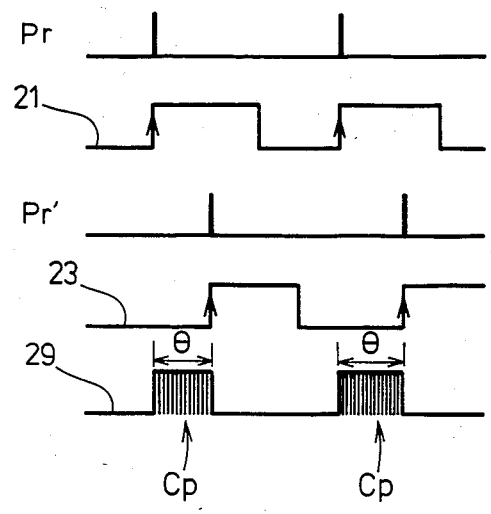
FIG. 6C is a time diagram of signals in FIG. 6A.

In FIG. 8, reference numerals for elements corresponding to those shown in FIG. 5 are the same numbers.

Referring to FIG. 8, reference numeral 50 is a circuit responsive to the phase modulated signal sin $(\omega ot+\theta)$ of secondary winding 2c of resolver 2 for producing a speed signal "C" with respect to rotational speeds of rotor 7. As shown in FIG. 11, the circuit 50 comprises a wave shaper for forming a rectangular wave from the phase modulated signal sin $(\omega ot+\theta)$, a synchronous rectifier, a low pass filter and a differentiator in time.

FIG. 11 illustrates a circuit block diagram for producing a speed signal $\dot{\theta}(=d\theta/dt)$ from a phase modulated signal Eo generated on a secondary winding 101 of a two phase resolver 100. In the figure, reference numeral 104 is a band pass filter, numeral 106 designates a wave shaper, numerals 108 and 110 are synchronous rectifiers (or phase discriminators), numerals 112 and 114 are low pass filters, numeral 116 is a switching circuit and numeral 118 is a differentiator in time.

A signal SQW $(\omega ot+\theta)$ designates a signal from wave shaper 106 to be a square wave (rectangular wave) where $\omega o$ is an angular velocity supplied from a reference signal generator 102 which produces signals SQW1 and SQW2 for use as rectification reference signals to synchronous rectifiers 108 and 110, respectively. Signal E1 ($=\sin \omega_1 t$) and E2 ($=\cos \omega_1 t$) generated in reference signal generator 102 are used as excitation signals supplied to primary windings 100A and 100B of resolver 100. More detailed circuit diagrams and its operations can be understood by referring to Japanese Patent laid open Nos. 57-187659 and 57-187660 or U.S. Ser. No. 363,525, now U.S. Pat. No. 4,481,468.

Reference numeral 52 designates a phase compensation circuit located between wave shaper 12 and synchronous rectifier 14, the phase compensation circuit being operated by the speed signal "c" and the output of wave shaper 12 defined as rectangular wave signal "b". In addition, reference signal generator 4 produces a signal "a" which is advanced by $\pi/2$ in its phase angles compared with the reference signal sin $\omega ot$.

Figure 9:
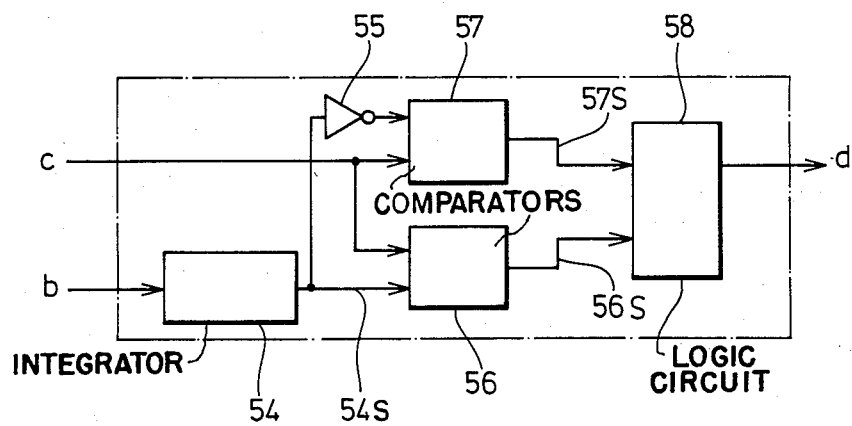
FIG. 9 is a detailed circuit block diagram of a phase compensation circuit shown in FIG. 8.
Figure 10:
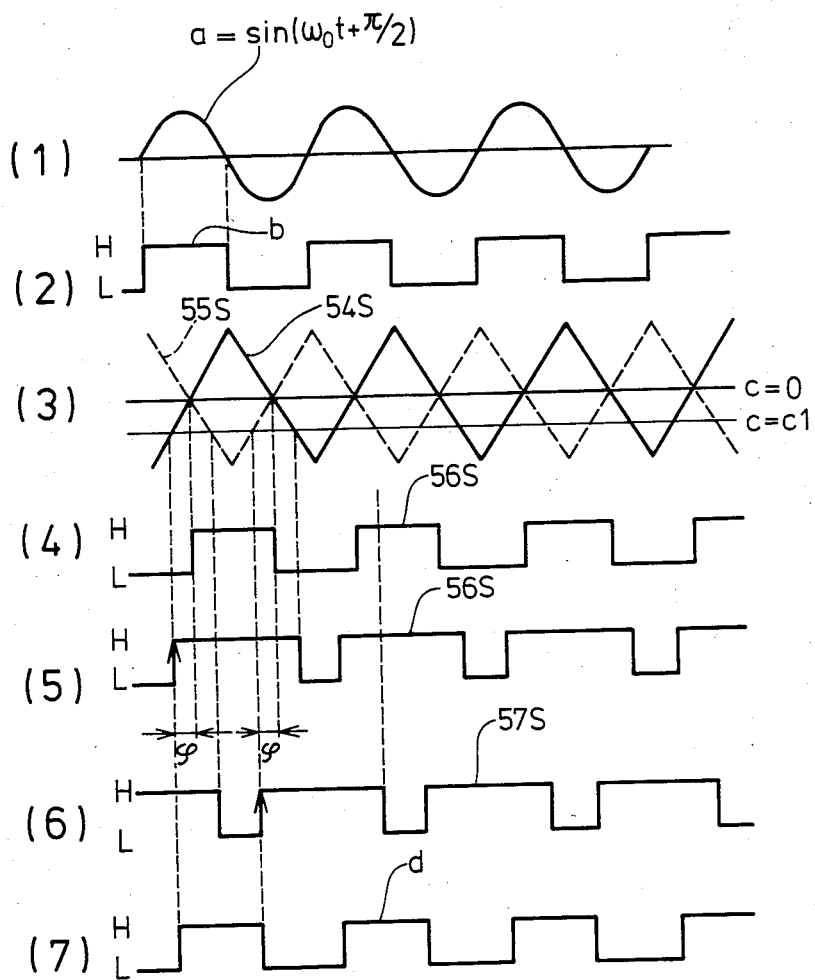
FIG. 10 illustrates a timing diagram including each signal shown in FIG. 9.

FIG. 9 illustrates a detailed circuit block diagram of phase compensation circuit 52 shown in FIG. 8, wherein reference numeral 54 is an integrator which integrates in time the rectangular wave signal "b" (referred to on the time chart (2) in FIG. 10) supplied from wave shaper 12, reference numeral 56 is a comparator for logically comparing the speed signal "c" with signal 54S output from integrator 54, both of the signals "c" and 54S being referred to on the time chart (3) in FIG. 10, and reference numeral 58 designates a logic operation circuit such as a d-type flip flop for producing a signal "d" referred to on the time chart (7) in FIG. 10, which phase angles are advanced by "$\phi$" compared to signal "b". Comparators 56 and 57 produce signals 56S and 57S, respectively. A more detailed description of the logical operation will be seen in the following description of the time charts (4), (5), (6) and (7) in FIG. 10.

FIG. 10 is a group of time charts (1) to (7), each showing signal waves in the phase compensation circuit 52. In to FIG. 10, the first time chart (1) shows the reference signal sin $(\omega ot+\pi/2)$ supplied from reference signal generator 4.

The second time chart (2) shows the rectangular signal "b" corresponding to the reference signal sin $(\omega ot+\pi/2)$.

The third time chart (3) shows the signal "c" as a straight line, the signal 54S as a triangle wave of a solid line, and the signal 56S as a triangle wave of a broken line, respectively, the signal 54S (56S) being formed as the result that the rectangular wave signal "b" is integrated in time.

The fourth time chart (4) shows the signal 56S when the speed signal "c"=0, that is, when the signal 54S is larger than the speed signal "c"(=0). In this case, the logical value of the signal 56S becomes high. Also, it should be noted that the signal 56S under the speed signal C(=0) has a delay of phase difference $\pi/2$ compared with the signal "b".

The fifth time chart (5) shows the signal 56S. When the speed signal "c" equals "C1" as shown in the time chart (3), the logical value of the signal 56S becomes high (H) when the signal 54S is larger than the speed signal C1.

The six time chart (6) shows the signal 57S under the condition that the speed signal "c" equals C1. In this case, the logical value of the signal 57S becomes high when the signal 56S is larger than the speed signal C1. Also, it should be noted that the rising up time of signal 56S on the time chart (5) has a phase lead by $\phi$ compared with the rising up time of signal 56S on the time chart (4), and that the rising up time of signal 57S on the time chart (6) has also a phase progression by $\phi$ compared with the getting down time of signal 56S on the time chart (4).

The seventh time chart (7) shows the signal "d" which is an output signal of the phase compensation circuit 52 in FIG. 9, the signal "d" being defined as a signal with its logical value of high (H) only during the time intervals between the rising up time of signal 56S and that of signal 57S.

Functions and operations of the system illustrated in FIG. 8 now will be explained.

In FIG. 8, when motor 6 rotates at the rotation speed $\dot{\theta}$ and a phase lag $\phi$ is generated in the drive unit, circuit 50 produces a speed signal "C" corresponding to the speed $\dot{\theta}$ and applies the signal "C" to phase compensation circuit 52. Phase compensation circuit 52 in turn produces from the signal "b" the rectangular signal "d" corresponding to a phase modulated signal sin ($\omega t + \phi$), since the circuit 52 functions to advance the signal "b" by the phase angle $\phi$ in response to the speed signal "C". Then, armature current command signal V·sin ($\omega t + \theta$) given from multiplier 8 is synchronously rectified by the signal "d" at synchronous rectifier 14, thereby producing a signal sin ($\theta + \phi$). Accordingly, since the input signal to the current control loop circuit 16 is in advance progressed by phase angle $\phi$ corresponding to the phase lag in the current control loop, the output signal of current control loop 16 results in I* sin $\theta$, that is, phase lags generated on current control loop 16 are cancelled.

Figure 7A:
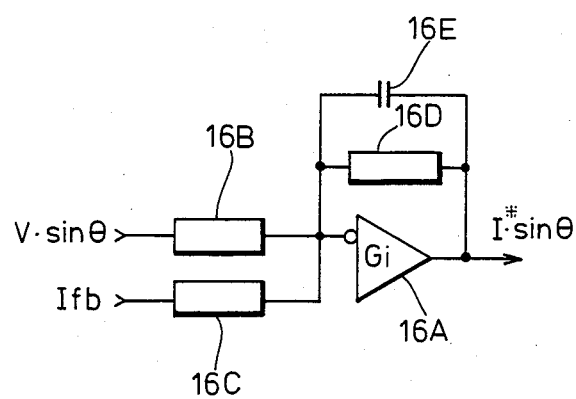
FIG. 7A illustrates a circuit of the current control loop.
Figure 7B:
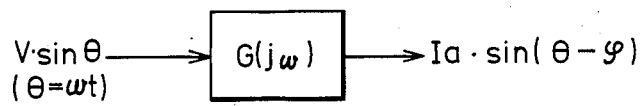
FIG. 7B is a block diagram of a transfer function corresponding to a power drive unit including a current control loop and armature windings for representing a presence of phase lags therein.
Figure 7C:
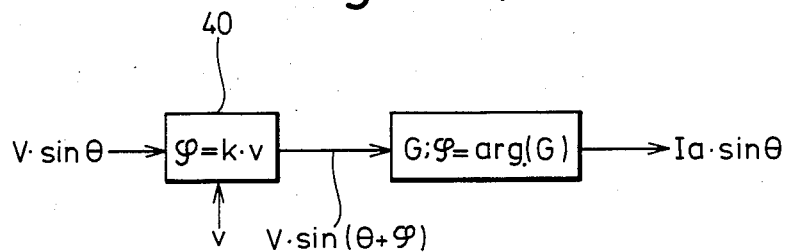
FIG. 7C is a block diagram for representing a phase compensation performed by the present invention.

In the case mentioned above, the amount $\phi$ of phase compensation is proportional to the values of angular velocity $\omega$ of synchronous motor 6 as shown in FIG. 7B. In the strict meaning, however, an actual current feedback loop has an element with first order lag, and the amount $\phi$ of the phase compensation satisfies the following equation:

$$\phi = \text{arc tan } \omega \cdot Ta = \tan^{-1} \omega \cdot Ta \quad (7)$$

The equation (7) indicates that the amount $\phi$ is not strictly proportional to angular velocity $\omega$ of the motor, but it is possible to approximate the relationship between "$\phi$" and "$\omega$" to a linear line except for extremely large values of $\omega$. Thus, when very strict accuracy for the relationships between $\phi$ and $\omega$ is required, it is possible to read out more accurate digital data $\phi$ corresponding to each measured angular velocity $\omega$ from a memory storing the relationships between $\phi$ and $\omega$, that is, the equation (7).

Though in FIG. 8 speed signal C is produced by circuit 50 connected with the secondary winding 2C of resolver 2, a tachometer generator can be used instead of circuit 50. Though FIG. 8 discloses a control system for synchronous motor 6, the present invention is also applicable to a speed control system for an induction motor by frequency control of the primary windings, particularly for an induction motor using the vector operation method.

In the vector operation method, as the induction motor rotates at a very high speed, the phase difference between an armature current and a revolving magnetic field is under the influence of frequency characteristics of a power drive unit including a current control loop. Accordingly, the phase difference can be cancelled by using the phase compensation method disclosed in the present invention. It is also possible for a person skilled in the art to modify the circuits disclosed in FIGS. 8 and 9 into a microprocessor system.

As mentioned before, it is an advantage of the present invention to be capable of driving a synchronous motor efficiently by always keeping the phase angles between the rotary magnetic field and the armature current of the motor to be at $\pi/2$ in a broad range of the motor's rotation. It is another advantage of the invention to drive the synchronous motor without heat generation under high speed rotation. It is still another advantage of the present invention to drive the synchronous motor with quick response to the changing of speed instruction.

While a preferred embodiment has been described, variation thereto will occur to those skilled in the art within the scope of the present invention which are delineated by the following claims.

What is claimed is:

1. A speed control apparatus for a synchronous motor comprising:
    means for designating a rotational speed of the motor;
    means for producing an angular position signal with respect to an angular position of a revolving magnetic field corresponding to that of a rotor on the motor;
    means for producing an armature current command signal in accordance with a speed instruction supplied from said speed designating means and said angular position signal supplied from said angular position signal producing means;
    rotational speed signal producing means responsive to said angular position signal for producing a speed signal corresponding to the speed of said motor;
    phase compensation means responsive to said speed signal for advancing a phase of said armature current command signal with respect to the angular position of said rotor of the motor; and
    means for producing a desired armature current on armature windings of the motor including a current control loop circuit responsive to said phase-advanced armature current command signal for outputting said desired armature current.

2. A speed control apparatus for a synchronous motor as in claim 1, wherein said angular position signal producing means comprises a resolver fixedly connected to the rotor of said motor, said resolver producing a phase modulated signal as the angular position signal.

3. A speed control apparatus for a synchronous motor as in claim 1, wherein said rotational speed signal producing means comprises a tachometer generator.

4. A speed control apparatus for a synchronous motor as in claim 2, wherein said rotational speed signal producing means comprises a circuit means which converts the phase modulated signal supplied from the resolver into the speed signal.

5. A speed control apparatus for a synchronous motor as in claim 4, wherein said circuit means comprises a wave shaper for forming a rectangular wave from the phase modulated signal, a synchronous rectifier, a low pass filter, a differentiator in time and a switching circuit.

6. A speed control apparatus for a synchronous motor as in claim 4, wherein said armature current command signal producing means comprises a multiplier for multiplying the phase modulated signal supplied from the resolver and the signal supplied from the speed designating means, a synchronous rectifier for synchronously rectifying a signal supplied from the multiplier with a rectification reference signal supplied from the phase compensation device, and a reference signal generator for generating a reference signal applied to said phase compensation device, said rectification reference signal advancing in phase by a phase angle corresponding to the difference in phase between said speed signal and said reference signal.

7. A speed control apparatus for a synchronous motor as in claim 4, wherein said armature current command signal producing means comprises a synchronous rectifier for synchronously rectifying a phase modulated signal supplied from the resolver with a rectification reference signal supplied from the phase compensation device, a reference signal generator for generating a reference signal applied to said phase compensation device, and a multiplier for multiplying a signal supplied from said rectifier with a speed instruction signal of said speed designating means, said synchronous rectifier further comprising a digital type of rectifier, and said rectification reference signal advancing said armature current command signal in phase by a phase angle corresponding to the difference in phase between said speed signal and said reference signal supplied from said reference signal generator.

8. A speed control apparatus for a synchronous motor as in claim 6, wherein said synchronous rectifier is an analogue type of synchronous rectifier.

9. A speed control apparatus for a synchronous motor as in claim 6, wherein said reference signal generator comprises a sinusoidal wave generator and a wave shaper.

10. A speed control apparatus for a synchronous motor as in claim 6 or 9, wherein said phase compensation device comprises an integrator for integrating in time said reference signal, a logical comparator for comparing the speed signal with an output signal of the integrator, and a logical operation circuit.

* * * * *